United States Patent [19]

Kobayashi et al.

[11] Patent Number: 4,577,155

[45] Date of Patent: Mar. 18, 1986

[54] DATA EXTRACTING CIRCUIT

[75] Inventors: Akira Kobayashi, Yokohama; Tadashi Kojima, Tokyo, both of Japan

[73] Assignee: Tokyo Shibaura Denki Kabushiki Kaisha, Kawasaki, Japan

[21] Appl. No.: 532,514

[22] Filed: Sep. 15, 1983

[30] Foreign Application Priority Data

Sep. 16, 1982 [JP] Japan .................. 57-161215

[51] Int. Cl.$^4$ .................. H03K 5/08; H03K 5/153
[52] U.S. Cl. .................. 328/164; 307/268; 307/359
[58] Field of Search .................. 307/359, 268, 358, 362; 328/117, 164; 340/511, 512

[56] References Cited

U.S. PATENT DOCUMENTS 3,398,373  8/1968  Caswell .................. 328/117

FOREIGN PATENT DOCUMENTS

| 156053 | 12/1981 | Japan .................. 328/164 |
| 836196 | 6/1956 | United Kingdom . |
| 1387738 | 3/1975 | United Kingdom . |
| 1484290 | 3/1977 | United Kingdom . |
| 1468624 | 3/1977 | United Kingdom . |
| 1529806 | 10/1978 | United Kingdom . |
| 2062393A | 5/1981 | United Kingdom . |
| 2072981 | 10/1981 | United Kingdom . |
| 2085685A | 4/1982 | United Kingdom . |

OTHER PUBLICATIONS

IBM Technical Disclosure Bulletin, vol. 20, No. 8 1/1978.

*Primary Examiner*—John Zazworsky
*Attorney, Agent, or Firm*—Cushman, Darby & Cushman

[57] ABSTRACT

A data extracting circuit for converting an analog signal derived from a D.C. component-free modulated digital signal stored on a recording medium, into a D.C. component-free digital signal with a comparator for comparing the analog signal with a reference signal to provide a compared signal. A phase inverter receives the compared signal and provides a first signal component which is in-phase with the compared signal, and a second signal component which is phase-inverted with respect to the compared signal. A clipping circuit limits the amplitude level of the first and second signal components to a predetermined level and provides first and second limited signal components. An integrating circuit separately integrates the first and second limited signal components and provides first and second integrated signals. An error amplifying circuit determines the difference between the first and second integrated signals and provides a signal corresponding to this difference to the comparator as the reference signal. The D.C. component-free digital output signal is derived from the first signal component.

2 Claims, 5 Drawing Figures

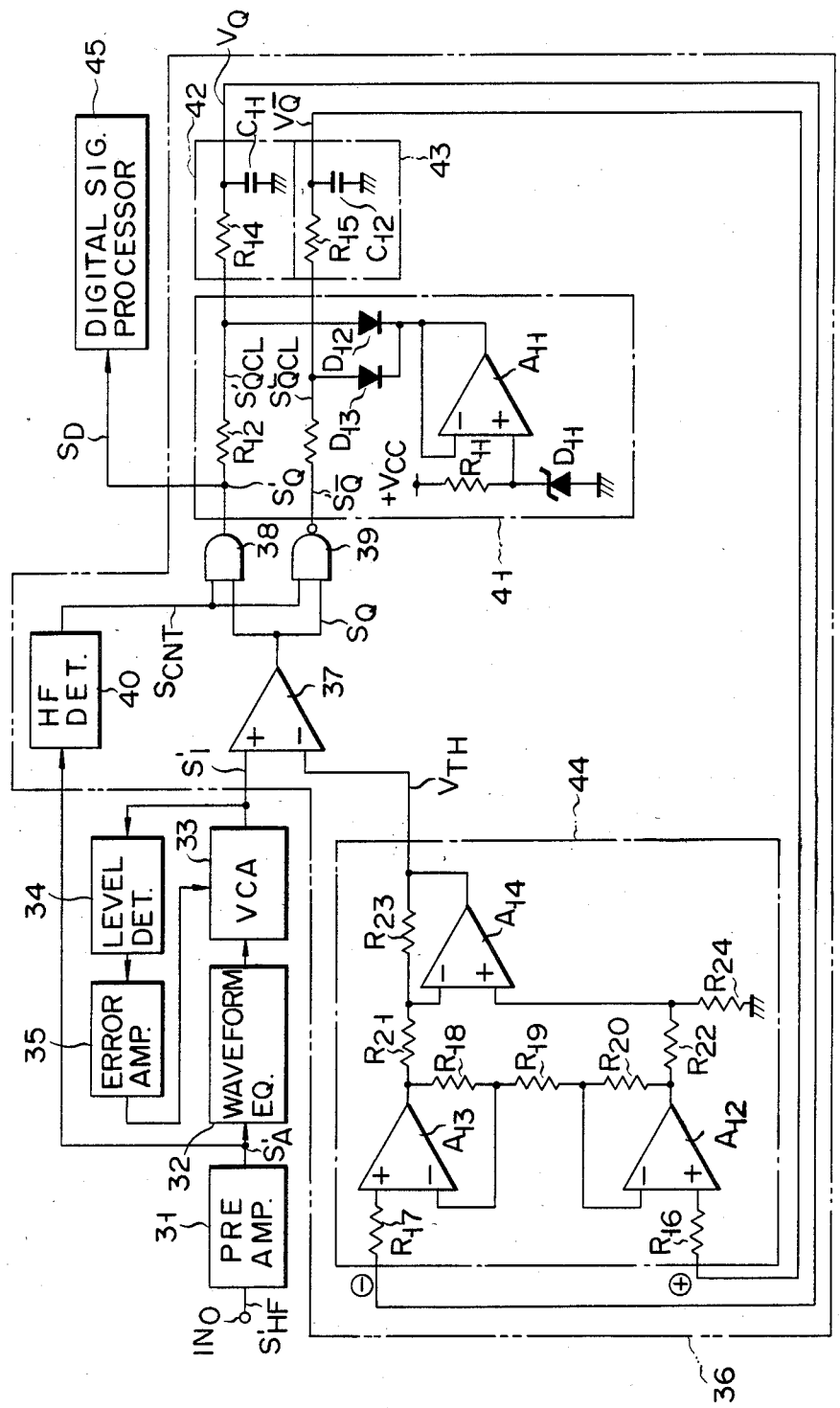
F I G. 4

DATA EXTRACTING CIRCUIT

BACKGROUND OF THE INVENTION

The present invention relates to an improvement in a data extracting circuit for extracting a digital signal of rectangular waveform digitally modulated, for example, so that a D.C. component becomes substantially zero and recorded on a recording medium by reproducing, as an analog signal via a pickup, the digital signal and identifying high and low levels from the reproduced signal.

Recently, a digital modulation system for digitally modulating an analog signal to reduce the D.C. component to substantially zero has been developed owing to the advances made in PCM recording and reproducing techniques. A design for suppressing the D.C. component of the output signal of a data extracting circuit has also been carried out in which a recording signal is reproduced as an analog signal from the recording medium such as a magnetic tape, an optical disc or the like, on which digitally modulated data is recorded in such a modulation system and digital data of high and low levels are identified and reproduced from the reproduced analog signal.

FIG. 1 shows a conventional data extracting circuit for a modulation signal in which a D.C. component is suppressed to zero or to a very low value. More particularly, a signal $S_{HF}$ read out via a magnetic head or an optical pickup (not shown) from a recording medium is amplified through an input terminal IN by a preamplifier 11 and is supplied as a signal $S_A$ to a waveform equalizer 12. Since this signal $S_A$ is distorted in the waveform by a noise, an interference between codes, jitter and the like, the signal is corrected by the equalizer 12 in the reproduced waveform. The signal $S_{EQ}$ thus corrected in the waveform is formed to a signal $S_{AGC}$ of constant level by an AGC amplifier 13A which consists of a voltage variable gain amplifier 13, a level detector 14 for detecting the output level of the amplifier 13, and an error amplifier 15 for comparing the output of the detector 14 with a STD voltage for setting a level and generating a control voltage for controlling the gain of the amplifier 13 so as to always attain the set level. The signal $S_{AGC}$ is compressed in its amplitude by a limiter amplifier 16 which is constructed to vary the bias point of the signal $S_{AGC}$ by varying the D.C. voltage $V_a$ at the point a, and consists of a capacitor $C_1$, resistors $R_1$ to $R_4$, diodes $D_1$, $D_2$ and an operational amplifier $A_1$. The compressed level becomes $2V_F$ at the peak-to-peak, where the forward voltages of the diodes $D_1$, $D_2$ are $V_F$. The output signal $S_{CLMP}$ of the amplifier 16 is shaped into a waveform by a comparator 17 and led as binary extracted data $S_D$ identified at the high and low levels to an output terminal OUT and produced as a D.C. voltage $V_b$ through a low pass filter 18 which consists of a resistor $R_5$, a capacitor $C_2$ and a resistor $R_6$, a capacitor $C_3$. The D.C. voltage $V_b$ indicates the D.C. component of the reproduced modulated signal of the extracted data, and when the voltage $V_b$ is zero, the extracted binary data $S_D$ is obtained. When the voltage $V_b$ is positive, the bias voltage of the output signal $S_O$ of the amplifier $A_1$ is shifted to the negative direction from the present state by enhancing the positive direction of the bias voltage $V_a$ of the amplifier $A_1$.

Conversely, when the voltage $V_b$ is negative, the bias voltage of the output signal $S_O$ of the amplifier $A_1$ is shifted toward the positive from the present state by lowering the bias voltage $V_a$ of the amplifier $A_1$ from the present state toward the negative direction. The integrated result of the signal $S_{CLMP}$ compressed in the amplitude of $\pm V_F$ is always zero in the above-described operation, the binary data $S_D$ shaped into a waveform by the comparator 17 coincides with the modulating regulation, and is outputted through a terminal OUT to a demodulator (not shown). A circuit for generating the optimum bias voltage by varying the bias voltage $V_a$ of the amplifier $A_1$ in response to the variation in the D.C. voltage $V_b$ as described above consists of an error (D.C.) amplifier 19 having resistors $R_7$, $R_8$ and an operational amplifier $A_2$, a STD voltage regulating circuit 20 having resistors $R_9$, $R_{10}$, and a variable resistor $VR_1$. In other words, the bias voltage $V_a$ is varied by a closed loop control system having the amplifier 16, the low pass filter 18 and an error amplifier 19 which follow the displacement of the modulating regulation.

FIG. 2 shows a graphical diagram illustrating the signals $S_I$, $S_O$, $S_{CLMP}$, $S_D$ in waveforms of the units in FIG. 1. $V_0$ in FIG. 2 shows the bias level of the output terminal of the amplifier $A_1$.

Specifically, the extracted data $S_D$ which coincides with the modulating regulation can be obtained by setting the level for identifying the amplitudes of high and low levels in the eye pattern of the input signal $S_I$ (such as a recorded and reproduced signal or received signal of the digitally modulated signal in which the D.C. component becomes zero as shown in FIG. 3) to the center of the amplitude of the component wave (which is called "eye center") having a time slot corresponding to the minimum inverting interval $T_{min}$. In this case, the eye center does not always coincide with the center of the entire amplitude of the input signal $S_I$ as shown in FIG. 3, waveform (a) which relates the recording state to the recording medium, but becomes high level as shown in FIG. 3, waveform (b) or low level as shown in FIG. 3, waveform (c). Even in this case, it is, of course, necessary to always move the identification level of the high and low levels up to the central level of the eye.

However, in the above-described conventional data extracting circuit, because the integrated value $V_b$ of the output signal $S_{CLMP}$ of the amplifier 16 does not always coincide with the modulation regulation in the state of $V_b=0$ due to the imbalance of the amplitude compressing characteristics caused by the irregular output offset voltage of the amplifier $A_1$ and forward voltage characteristics of the amplitude compressing diodes $D_1$, $D_2$ in the amplifier 16, and the standard voltage of the amplifier 19 which cannot be fixed at zero, it is necessary to provide a standard voltage regulator 20 which employs a variable resistor $VR_1$. Further, the large displacement from the set value of the standard voltage introduces increases in the error rate due to the mismatch of the extracted binary data $S_D$ to the modulation regulation, and it is necessary to provide the standard voltage regulator 20 as a circuit which is only marginally affected by the influence of the variation in the temperature and moisture, the variation in the voltage of a standard voltage source or a vibration, which creates complicated a circuit configuration that is expensive.

SUMMARY OF THE INVENTION

An object of the present invention is to provide an extremely efficient data extracting circuit capable of being adapted to a device to reproducing digital data recorded on a recording medium such as a magnetic tape or an optical disc or the like by a digital modulation system so that the D.C. component becomes substantially zero or a base band data transmission system and a circuit that contributes to circuit configuration simplification and cost reduction.

According to one aspect of the present invention, there is provided a data extracting circuit which compares, by first means, the signal from which data is extracted by identifying the binary level of high and low levels, with a standard level signal. The compared output of the first means is negatively and positively inverted by second means. The negatively inverted output signal and the positively inverted output signal of the second means are individually integrated by third and fourth means. The differential signal between the output signals of the third and fourth means is extracted by fifth means, and is supplied as the standard level signal of the first means.

According to the present invention, the conventional standard voltage regulator can be eliminated, simplifying the circuit configuration and reducing the cost of the data extracting circuit.

BRIEF DESCRIPTION OF THE DRAWINGS

FIG. 4 is a structural view showing an embodiment of a data extracting circuit according to the present invention.

DETAILED DESCRIPTION OF THE PREFERRED EMBODIMENTS

Figure 1:
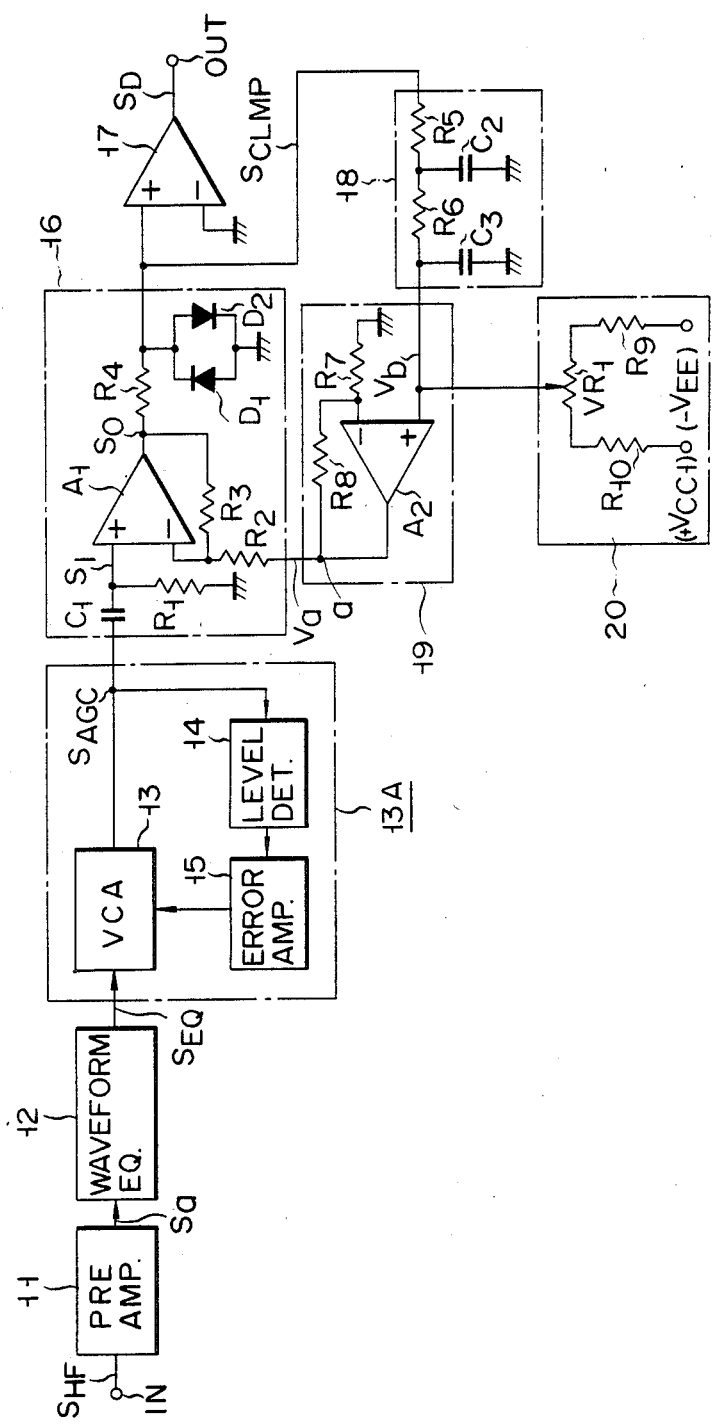
FIG. 1 is a structural view showing the conventional data extracting circuit.
Figure 2:
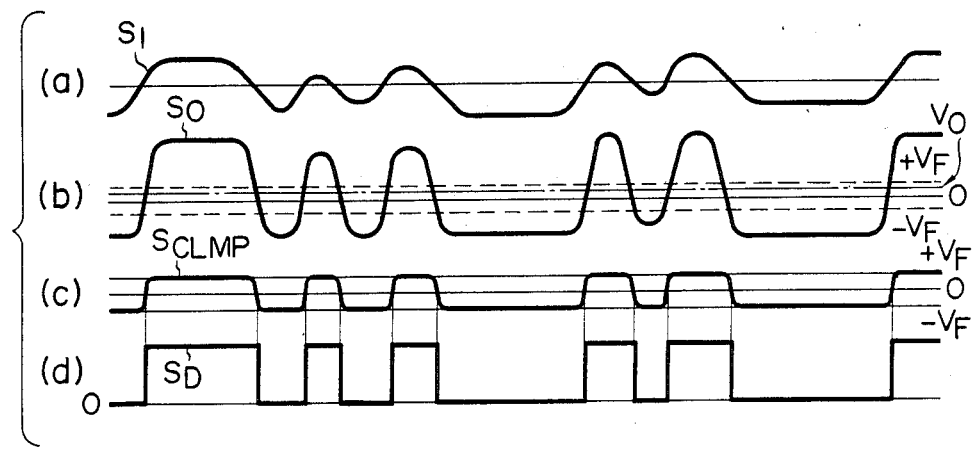
FIG. 2 shows timing charts used for describing the operation of the circuit in FIG. 1.
Figure 3:
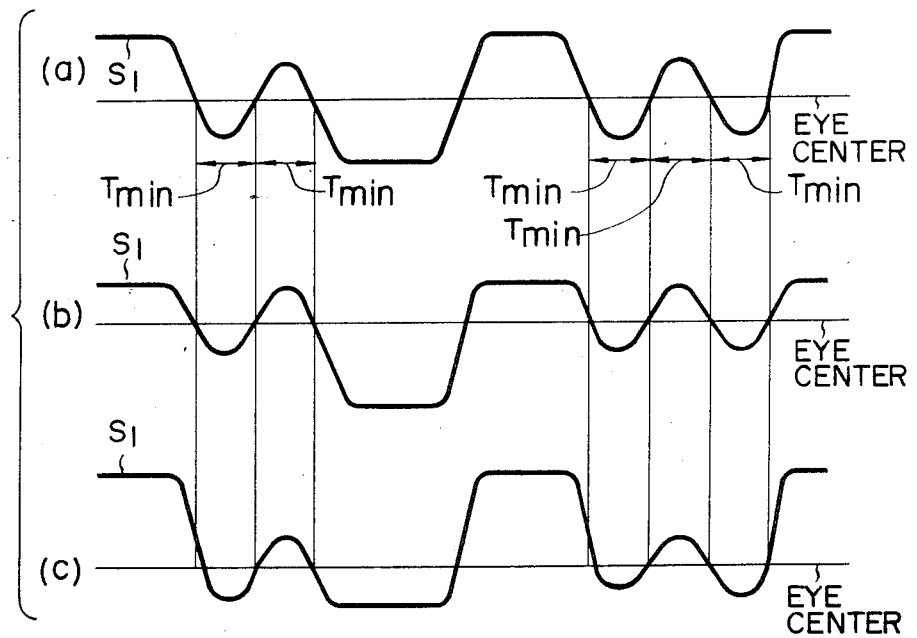
FIG. 3 shows graphical diagrams used for describing the relationship between the input signals and the eye center level of the data extracting circuit.

FIG. 4 shows an embodiment of a data extracting circuit 36 according to the present invention, surrounded by two-dotted chain lines.

An input signal $S'_{HF}$ which is a signal read from the pickup of a disc reproducer for reproducing a digital audio disc, on which a PCM signal is, for example, recorded, not shown, or a received signal in a base band data transmission system is supplied as a signal $S'_A$ through an input terminal $IN_0$ and a preamplifier 31 to a waveform equalizer 32. The output signal of the equalizer 32 is supplied to the input terminal of a voltage variable gain amplifier 33. This amplifier 33 is returned to the control input terminal with an output signal $S'_I$ from the amplifier 33 through a level detector 34 and an error amplifier 35. The above-described output signal $S'_I$ is supplied to the non-inverting input terminal (+) of a comparator 37 which forms a portion of a data extracting circuit 36. The above-described preamplifier 31, waveform equalizer 32, voltage variable gain amplifier 33, level detector 34, and error amplifier 35 are operated in the same manner as those in FIG. 1.

The output signal $S_Q$ of the comparator 37 is supplied to one input terminal of an AND circuit 38 and to one input terminal of a NAND circuit 39 so that the signal becomes negatively and positively inverted. The AND circuit 38 and the NAND circuit 39 operate in a predetermined gate operation in such a manner that output signal $S_{CNT}$ from a well-known HF detector 40 (for detecting whether the output signal $S'_A$ of the preamplifier 31 is higher than a predetermined voltage level or not) is supplied commonly to the other respective input terminals of the AND circuit 38 and the NAND circuit 39. In this case, when the output signal $S_{CNT}$ is absent and the signal to be extracted is lower than a predetermined level, the output signals from the AND circuit 38 and the NAND circuit 39 are stopped so that noise is not applied at the non-signal time to the circuits after low pass filters 42, 43.

The output $S'_Q$ and $S'_{\overline{Q}}$ of the AND circuit 38 and NAND circuit 39 are supplied to a pair of input terminals of an amplitude limiter 41, the output amplitude levels are individually limited (corrected) to become equal to each other, and are supplied as the output signals $S'_{QCL}$ and $S'_{\overline{Q}CL}$ of the limiter 41 to the input terminals of low pass filters 42 and 43. The limiter 41 consists of a voltage source which has a constant-voltage diode $D_{11}$, a resistor $R_{11}$ and an operational amplifier $A_{11}$; and a known clipping circuit which has resistors $R_{12}$, $R_{13}$, and diode $D_{12}$, $D_{13}$ with substantially equal characteristics. The filters 42 and 43 become integrating means, which consists of a resistor $R_{14}$, a capacitor $C_{11}$, a resistor $R_{15}$, and a capacitor $C_{12}$.

The output signals $V_Q$ and $V_{\overline{Q}}$ of the filters 42 and 43 are supplied to the non-inverting input terminal (+) and the inverting input terminal (−) of an error amplifier 44 to be described later. This amplifier 44 has operational amplifiers $A_{12}$, $A_{13}$, $A_{14}$, and resistors $R_{16}$ to $R_{24}$ with high input impedance, and is constructed so that the output signal (the output signal of the amplifier $A_{14}$) $V_{TH}$ is supplied to the inverting input terminal (−) of the comparator 37.

The output signal $S'_Q$ of the AND circuit 38 becomes the output signal $S_D$ of the data extracting circuit 36 and is supplied to the input terminal of a digital signal processor 45.

The operation of the above-described embodiment of the invention, which is constructed so that the D.C. component of the reproduced signal of the signal recorded by digital modulation becomes substantially zero or the received signal of the base band data transmission system is supplied as the input signal $S'_{HF}$ of the preamplifier 31 to the input terminal $IN_0$, will now be described with reference to FIG. 5.

Figure 5:
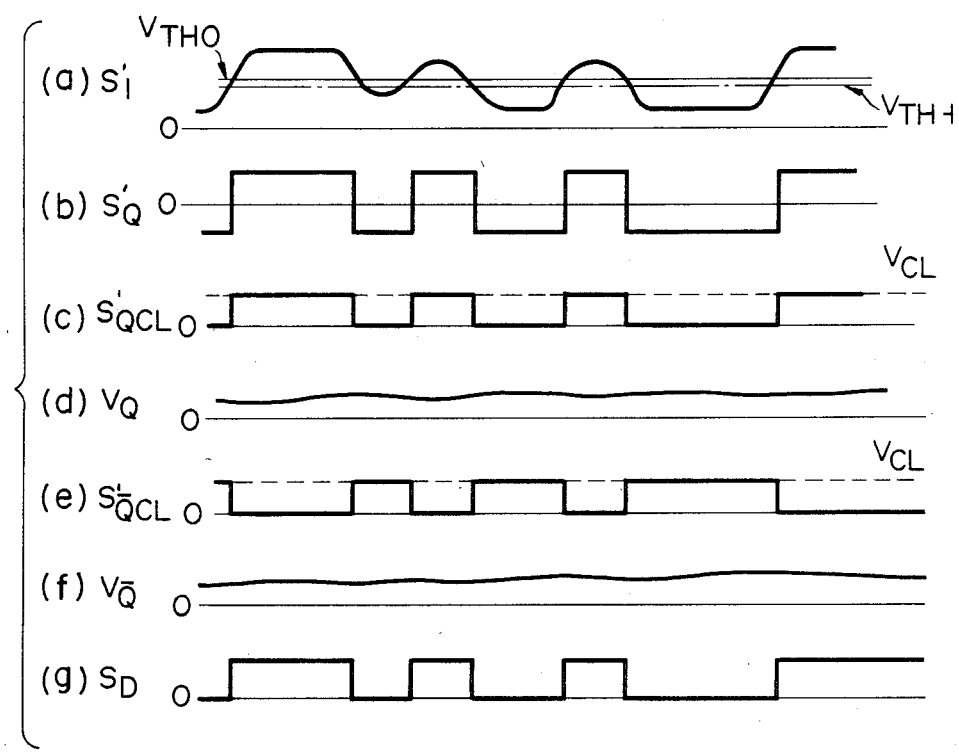
FIG. 5 shows timing charts used for describing the operation of the circuit in FIG. 4.

The signal $S'_{HF}$ for extracting data, supplied to the input terminal $IN_0$, is supplied as the signal $S'_I$ having, for example, a positive D.C. component sequentially through the preamplifier 31, the waveform equalizer 32, and the voltage variable gain amplifier 33 to the non-inverting input terminal (+) of the comparator 37 (FIG. 5, waveform (a)). At this time, the HF, detector 40 detects that the signal $S'_A$ is higher in voltage than a predetermined level, and sets the other respective input terminals of the AND circuit 38 and the NAND circuit 39. As will be evident from the following description, a D.C. component may be superposed on the input signal $S'_I$ supplied to the comparator 37. Then, when the input signal $S'_I$ shown, for example in FIG. 5 is identified as high or low level by the normal threshold value $V_{TH0}$, the integrated value of the signal $S_Q$ converted to a rectangular wave by the comparator 37 becomes positive.

In the prior art circuit of FIG. 1, a method of comparing one integral value with a standard voltage is employed, but in the circuit according to the present invention in FIG. 4, two outputs are negatively and positively inverted by converting the output $S_Q$ of the comparator 37, for example, through the AND circuit 38 and the NAND circuit 39, to the signals $S'_Q$, $S'_{\overline{Q}}$ of a TTL (transistor transistor logic) level. The output voltage of the TTL level is highly irregular when the output $V_{OH}$ is higher than the low level output voltage $V_{OL}$, and when $S'_Q$, $S'_{\overline{Q}}$ are integrated, the errors of the outputs adversely affect the level of identification. Accordingly, it is necessary to integrate after the amplitude levels of the signals $S'_Q$ $S'_{\overline{Q}}$ are matched. Thus, the amplitude of the high level is particularly compressed by the limiter 41 to become the same amplitude as the low level, and the signals $S'_{QCL}$, $S'_{\overline{Q}CL}$ are obtained (FIG. 5, waveform (e)). In this case, when the Zener voltage of the constant-voltage diode $D_{11}$ forming the amplitude limiter 41 is $V_Z$ and the forward voltages of the diodes $D_{12}$, $D_{13}$ are $V_F$, the amplitude $V_{CL}$ of high level is limited to $V_Z+V_F$. In this case, the irregularity of $V_F$ can be reduced by utilizing the junction between the base and the emitter of 1-chip dual transistor for differentially amplifying on the same substrate, and the $V_F$ varies similarly to the variation in the temperature as the diodes $D_{12}$, $D_{13}$. Accordingly, the imbalance of the extracted data with a marginal error (D.C. component is zero, positive or negative) can be detected for the extracted data with marginal error due to variation in the temperature. Then, the integrated value $V_Q$ of the signal $S'_Q$ and the integrated value $V_{\overline{Q}}$ of the signal $S'_{\overline{Q}}$ are positive at the integrated value of $S'_Q$ due to the filters 42 and 43, $V_Q - V_{\overline{Q}} > 0$ (FIG. 5, waveform (d) and (f)).

On the other hand, the output voltage $V_{TH}$ of the error amplifier 44 is given by the following equation:

$$V_{TH} = \frac{R_c}{R_b}\left(1 + \frac{2R_a}{R_b}\right)(V_Q - V_{\overline{Q}})$$

where $R_a$ represents the resistance value of the resistors $R_{18}$ to $R_{22}$, $R_b$ represents the resistance value of $R_{21}$, $R_{22}$, and $R_c$ represents the resistance value of the resistors $R_{23}$, $R_{24}$.

In this case, since the relationship $V_Q - V_{\overline{Q}} > 0$ exists, $V_{TH}$ is set in response to the value of $(V_Q - V_{\overline{Q}})$ so that the threshold value of the comparator 37 is higher than $V_{TH1}$ and $(V_Q - V_{\overline{Q}})$ reaches zero. In other words, the loop which is composed of the error amplifier 44 reaches the balanced point, in which state $V_{TH}$ requires no adjustment and becomes coincident to the center level of the eye of the input signal $S'_I$.

On the other hand, when the data is extracted in the state where the threshold value of the comparator 37 is higher than $V_{TH0}$, the difference becomes $V_Q - V_{\overline{Q}} > 0$, and the threshold value of the comparator 37 decreases and becomes coincident to the center of the eye level of the input signal $S'_I$.

Since the binary data which coincides with the modulation regulation of the digital modulation (i.e., the D.C. component is substantially zero) are automatically obtained in response to the input signal without the requirement of any particular adjustment as described above, the data extracting circuit can not only be simplified, but is only marginally affected by the influences of temperature variations and power supply voltage.

Further, since the amplifier 44 is constructed, as shown in FIG. 4, to have large input impedance, the errors of the output voltages $V_Q$ and $V_{\overline{Q}}$ of the filters 42 and 43 which are affected by the influences of the respective amplifiers $A_{12}$, $A_{13}$, $A_{14}$ forming the differential amplifier 44 can be ignored. In this case, the amplifier 44 may be composed of only one operational amplifier so as to reduce its cost without any actual problem.

Since, in the irregular Zener voltage of the diode $D_{11}$ forming the amplitude limiter 41, the variation in the Zener voltage due to the variation in the temperature varies in the same phase as $V_Q$ and $V_{\overline{Q}}$ and the error amplifier is constructed to have a large in-phase component removal ratio, the influence of the variation need not be considered. Noise and error which are applied in phase to the other $V_Q$ and $V_{\overline{Q}}$ can also be similarly ignored.

The present invention is not limited to the particular embodiments described above.

In addition, various other changes and modifications may be made within the spirit and scope of the present invention.

According to the present invention as described in detail above, the data extracting circuit is simplified so as to enable adjustment of the circut so that it may be adapted for a device for reproducing digital data recorded on a recording medium such as a magnetic tape by a digital modulation system so that the D.C. component becomes substantially zero or becomes a base band data transmission system, thereby stabilizing the operation and excluding the influence of variations in temperature and voltage of the power supply, and the extraction of the rectangular data is performed by identifying the high and low levels correcponding to the received wave of the digital data signal reproduced by the pickup or received data of the base band data transmission system to modulation regulation, thereby contributing to cost reduction.

What is claimed is:

1. A data extracting circuit for converting an analog signal derived from a D.C. component-free modulated digital signal stored on a recording medium, into a D.C. component-free digital signal, comprising:

comparator means for comparing said analog signal with a reference signal and providing a compared signal;

phase inverting means for receiving said compared signal and providing a first signal component which is in-phase with said compared signal, and a second signal component which is phase-inverted with respect to said compared signal, said D.C. component-free digital signal being derived from said first signal component;

clipping means for limiting an amplitude level of said first and second signal components to a predetermined level to provide first and second limited signal components;

integrating means for separately integrating said first and second limited signal components and providing first and second integrated signals; and means for determining a difference between said first and second integrated signals and supplying a signal corresponding to said difference to said comparator means as said reference signal.

2. A circuit according to claim 1 wherein said phase inverting means inlcudes an AND gate supplying said first signal component, and a NAND gate supplying said second signal component, and further including:

detector means for ensuring that noise is not included in said first and second signal components, said detector means receiving said analog signal and comparing its amplitude level with a second predetermined level and providing a signal to said AND and NAND gates when said analog signal exceeds said second predetermined level.

* * * * *